Sept. 26, 1967 G. K. TOLNAI 3,343,280

LANGUAGE TEACHING RECORDING-REPRODUCING APPARATUS AND METHOD

Filed Dec. 10, 1964 3 Sheets-Sheet 1

INVENTOR.
GABOR KORNEL TOLNAI
BY
Woodhams, Blanchard and Flynn
ATTORNEYS

LANGUAGE TEACHING RECORDING-REPRODUCING APPARATUS AND METHOD

Filed Dec. 10, 1964 3 Sheets-Sheet 2

INVENTOR.
GABOR KORNEL TOLNAI
BY
Woodhams, Blanchard and Flynn
ATTORNEYS

INVENTOR.
GABOR KORNEL TOLNAI
BY
Woodhams, Blanchard and Flynn
ATTORNEYS

United States Patent Office 3,343,280
Patented Sept. 26, 1967

3,343,280
LANGUAGE TEACHING RECORDING-REPRODUCING APPARATUS AND METHOD

Gabor Kornel Tolnai, 14 Asbjornsens vag, Bromma, Sweden

Filed Dec. 10, 1964, Ser. No. 417,408
Claims priority, application Sweden, Dec. 10, 1963, 13,677/63
9 Claims. (Cl. 35—35)

When teaching languages with so-called tape recorders for magnetic sound recording generally the teacher records a special exercise task on a track or a channel of the tape in advance, the pupil then being handed a tape recorder, by means of which he can listen to the recording of the teacher, and on an adjacent track himself record the result of his studies. It is often a tedious task for the pupil before recording his own version to rewind the tape a certain length in order repeatedly to be able to listen to the passage containing the teacher's recording. In addition, the handling of the tape recorder often gives rise to the pupil's getting irritated. Should the pupil not be particularly technically minded, it may often happen that he rewinds the tape an unnecessary long section, and thus repeats a passage he has already finished with. This distracts the pupil and deteriorates the result of his studies.

The present invention has for its object to solve the above problems in a practical, suitable manner. A device according to the present invention comprises in its widest sense an endless loop of a tapelike sound recording carrier arranged to be driven at constant speed, the sound reproducing heads being located at a portion of the tape loop, and it is substantially characterized in that a plurality of sound reproducing heads are arranged one beside the other transversely to the running direction of the tape, a group or assembly of heads being arranged for scanning or reading off the recordings on the respective tracks of the tape, and another group of heads for recording sounds on the adjacent track of the tape, the device being such that the heads reading off the recording may optionally be connected to one or several sound reproducing points and that a microphone line is provided for each sound reproducing point and arranged to be connected to a special head of the assembly of recording heads.

Figure 1:
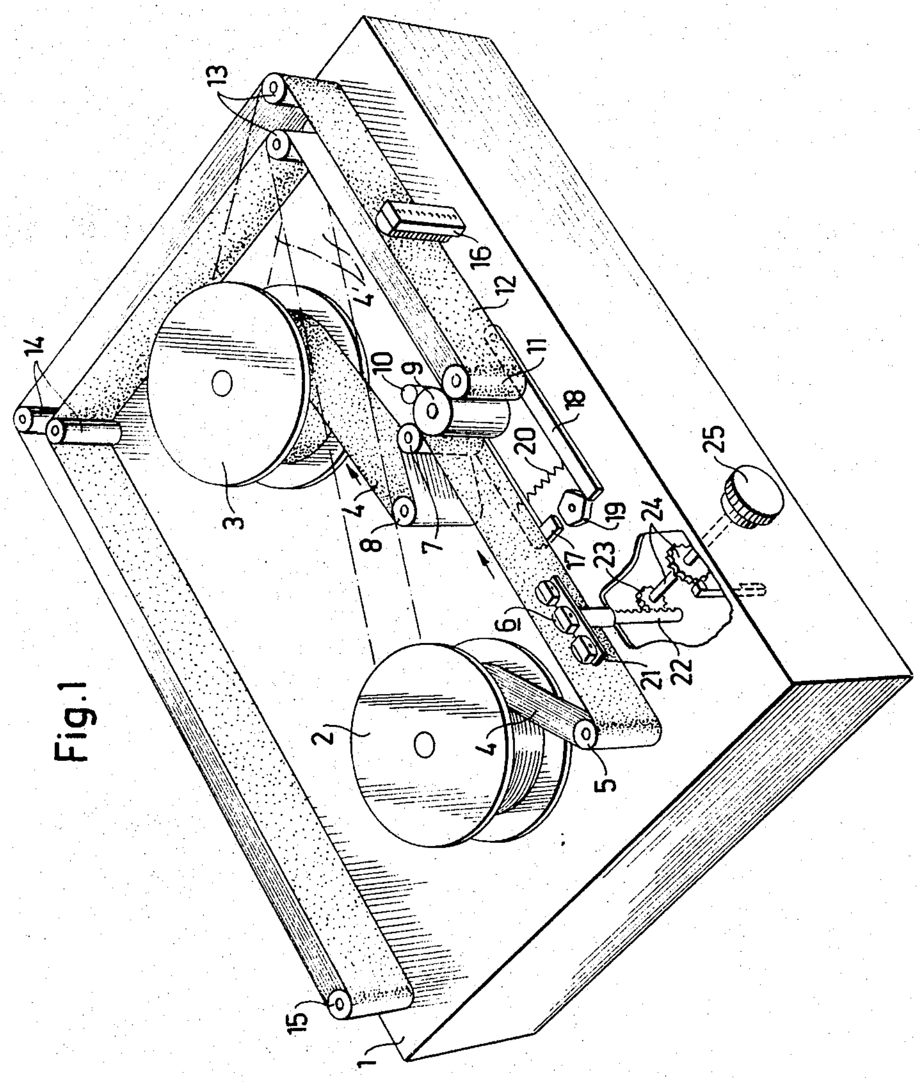
Figure 2:
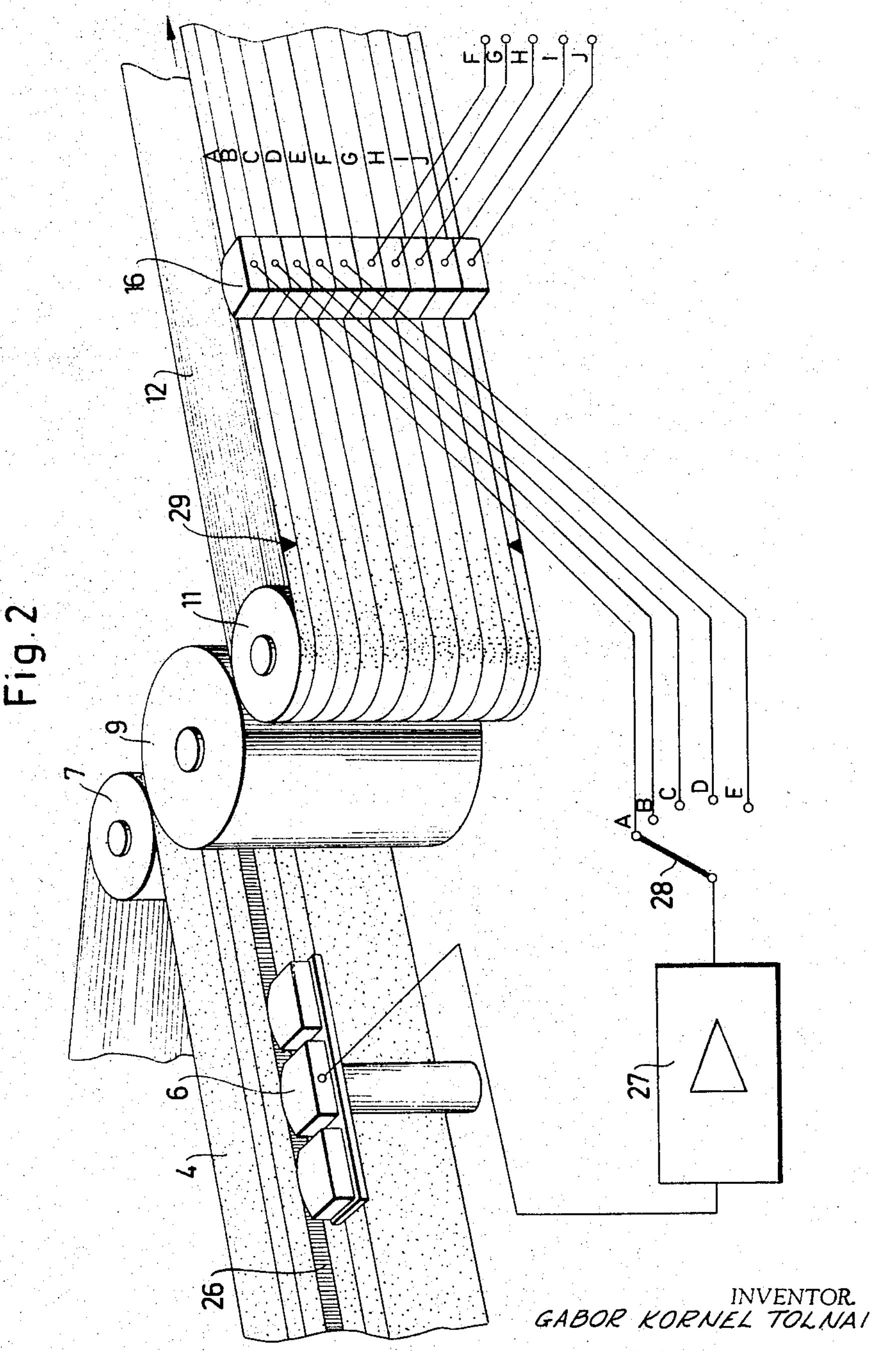
Figure 3:
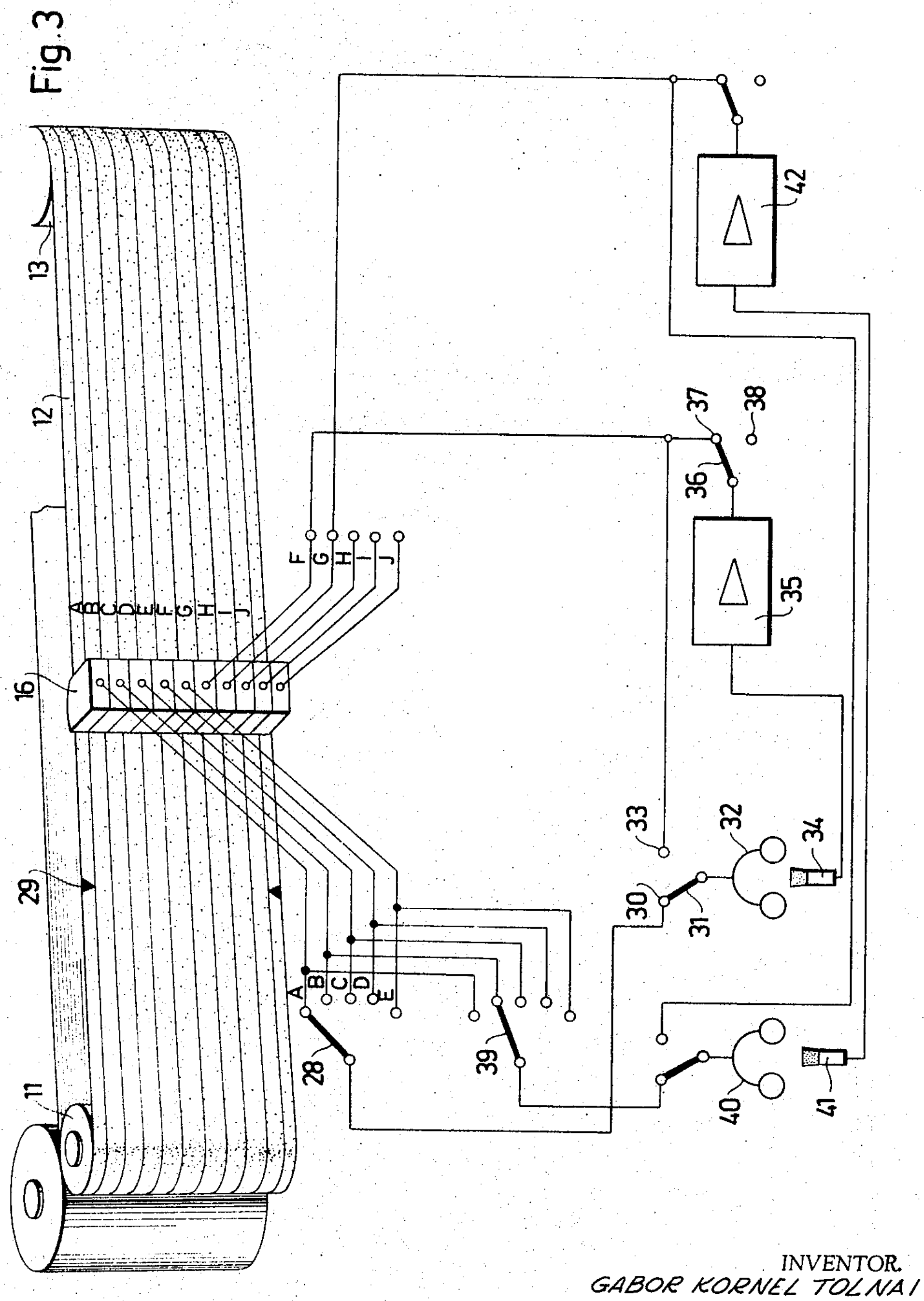

The invention will be described more in detail hereinafter with reference to the accompanying drawing, in which FIG. 1 shows an embodiment of the invention applied to a so-called tape recorder and FIG. 2 is a view of the track distribution on the endless tape loop, and FIG. 3 is a circuit illustrating how to connect the device for teaching purposes.

The apparatus shown in FIG. 1 is mounted on a base plate 1 on which two tape reels 2 and 3 are rotatably arranged and carry a tape 4 for magnetic sound recording. The free portion of the tape running between the two tape reels is to run from reel 2 over an idler roller 5, a set of sound reproducing heads 6 (erasing, record and playback heads), a feeder roll 7, another idler 8 and up to the tape reel 3. The feeder roll 7 is arranged to be driven by a driving wheel or capstan 9 which in turn is edge-driven by the shaft 10 of a motor. The capstan 9 is also arranged to drive a further feeder roll 11 for an endless tape loop 12 running about the same. The loop 12 is led around two couples of idlers 13, 14 and around a roller 15. At the loop running between the idler couple 13 and the driving roll 11 a number of sound reproducing heads 16 are placed one beside the other in a pile in the cross direction of the tape loop so that each head scans a track or channel of the tape 12. To operate the drive partly of the tape 4 and partly of the tape loop 12 each driving roll 7 and 11 is placed on a lever 17 and 18, respectively. The free ends of the levers are arranged to cooperate with a five-faced cam disc 19, the said ends being arranged to bear on the cam disc and/or keep the driving rolls 7, 11 in engagement with the capstan 9 by means of the spring 20. The assembly of sound reproducing heads 6 is located on a platform 21 placed on the end of a lift device comprising a displaceable shaft 22 with a rack cooperating with a pinion 23 fixed on a shaft 24 carrying a steering wheel or index wheel 25. By the said lift device the sound reproducing heads may be pushed transversely along the tape 4, thus making it possible to trace different tracks for recording and playback.

The function of the arrangement will now be described with reference to FIGS. 2 and 3, in which both the tape 4 and the tape loop 12 with their appertaining sound reproducing heads are shown diagrammatically. As will be seen relatively wide tapes are used, which can hold a plurality of parallel tracks or recording channels.

In FIG. 2 it is assumed that a track or recording channel 26 of the tape 4 contains a language lesson divided into short sentences of a duration of approximately 10 to 15 seconds in a sequence one after the other. One playback head of the assembly 6 of sound reproducing heads is connected to the input of a recording amplifier 27, whose output is connected to a switch 28, optionally switchable to five lines denoted A, B, C, D and E. These lines each lead to one sound reproducing head each of the group 16 of sound reproducing heads for the tape loop 12. The said sound reproducing heads are arranged to form recording channels A, B, C, D and E on the tape loop 12 corresponding to the said lines. The tape loop 12 is suitably provided with index marks 29 for indicating an initial point for the loop. The remaining five heads of the group or assembly 16 are arranged to scan one channel, F, G, H, I and J each and are connected to lines having respective denotations. The said lines are each to be allocated to one pupil, which will be further explained with reference to FIG. 3.

In order to prepare a lesson a teacher takes the following steps. The tape loop 12 is preferably advanced such a distance that the index marks are just opposite the assembly of heads 16, thus loading the tape to its starting position and the lift device 21 to 25 being set so that the head 6 is just opposite the said recorded lesson track 26. Now the tape 4 and the tape loop 12 are started thus re-recording the first sentence of the lesson from the tape 4 through the amplifier 27, the switch 28 to line A and onto track A on the tape loop 12. If the break up to the next sentence on the tape 4 is suitably adjusted to the time of revolution of the tape loop 12, the switch 28 need merely be switched over to line B, when the index mark 29 passes assembly 16 of the heads. The following sentence will then be re-recorded to track B on the tape loop 12. In case the next sentence would follow immediately after the one transferred to track B, the tape 4 is stopped by operating the cam disk 19 so that the driving roll 7 is brought out of mesh with the capstan 9. The teacher now waits for the return of the index mark 29 to head assembly 16, then starts the tape 4 again and switches over switch 28 to line C. In a similar way the re-recording is carried out in respect of tracks D and E on tape loop 12. In the case illustrated only five tracks corresponding to five sentences have been indicated for the sake of simplification. In practical operation, on the other hand, preferably 15 to 20 tracks and a corresponding number of lines are arranged to enable the teacher to record a whole lesson on tape 12.

After completion of the re-recording onto the tape loop 12 the amplifier 27 is disconnected from the switch 28 which is instead connected with one contact 30, see FIG.

3, of an additional switch 31 connected to an earphone 32. The earphone is to be used by one pupil. In its second position 33 the switch 31 can connect the earphone 32 to line F for listening to the respective track on the tape loop 12. In order not unnecessarily to complicate the figure the playback amplifiers employed in practical life are not shown in the diagram. At the seat of the said pupil a microphone 34 is located, which is connected to the input of a recording amplifier 35, whose output is connected to a switch 36, one contact 37 of which is connected to the said line F while the other contact 38 is disconnected. In parallel to the switch 28 still another switch 39 is arranged for connecting an earphone 40 in the equivalent manner as described with regard to the earphone 32. The earphone 40 is intended to be used by another pupil, who is also provided with a microphone 41 which is connected to a recording amplifier 42, thence to line G and the corresponding track on the loop 12. As mentioned hereinbefore each line F to J is allocated to one pupil, the number of switches 28 to 39 corresponding to the number of pupils, being arranged in parallel.

At the beginning of the lesson the loop 12 is started and will rotate continuously during a certain period of the lesson. The pupil will then act in the following way. Assuming that the pupil using the earphone 32 has the switch 31 in position 30 and the switch 28 connected to line A. The pupil can now listen to the sentence recorded on track A on the loop 12. When the pupil finds that he has sufficiently and carefully learned the sentence spoken by the teacher, he switches over the switch 36 to the position 37 shown in FIG. 3, the microphone 34 and the recording amplifier 35 then being connected to line F and the corresponding head. Now the pupil speaks his version of the respective sentence. This sentence may be repeated several times by the pupil, depending on the length of the sentence and the time of revolution of the loop 12. After completing his recording the pupil can listen to his own recording by switching the switch 36 to position 38 and the switch 31 to position 33, this enabling him to compare his own recording to that of the teacher by switching over the switch 31 between positions 30 and 33. Should the pupil find that the result is not satisfactory when comparing his recording with that of the teacher, he can again make a new recording on his track of the loop. It is then, of course, assumed that the necessary steps have been taken for erasing the previous recording. Such arrangements are not shown in the drawing.

Should the pupil find his recording satisfactory, he can set the switch 28 to position B, the track B on the loop 12 then being played back and reproduced in the earphone 32, i.e. the teacher's second sentence of the lesson. After listening sufficiently to the teacher's recording the pupil can, as described hereinbefore, record this sentence by switching over the switch 36, thus erasing the previous recording, and he can then in the manner described compare his recording with that of the teacher. The said pupil has thus been allocated a track F for practicing. The pupil may now by means of the switch 28 optionally select any of the teacher's tracks A to E on the tape 12 to practice the various parts of the lesson.

Another pupil's switch is as already mentioned denoted with 39 and connected in parallel to the switch 28 in that sense that the leads from lines A, B, C, D and E run to the corresponding contacts in the switch 39.

The said second pupil is allocated track G as a practicing track, but he may totally independent of the first pupil learn the sentences recorded on the teacher's track A to E by using the switch 39, as did the first pupil with the switch 28. Each pupil need thus only operate three switches during his studies, i.e. switches 28, 31 and 36, respectively. The switch 28 is naturally set stepwise to its various contacts, while the switches 31 and 36 can be made as bouncing push buttons. It is, for example, only necessary to keep the switch 36 in position 37 for the period of time any recording takes place on the respective pupil channel. Likewise, it is only necessary to be able to keep the switch 31 pressed down into position 33, if the pupil wishes to listen to his own results. It will be clear that in the case shown a plurality of pupils may simultaneously work with one single tape recorder as in the case here illustrated without affecting the mechanical driving means of the apparatus in any way. The listening and recording actions are controlled simply by plain push buttons and switches.

When the pupils have completed their exercises during a lesson and merely a short time remains of the lesson, the teacher stops the tape loop 12 and lifts it out of its path. He then puts the tape located on the reels 2 and 3 over the idler couple 13, as will be seen by FIG. 1, in a loop indicated by dot-dash lines 4. The teacher then again starts the driving mechanism controlling the tape loop, i.e., the driving rolls 9 and 11, thus letting the pupils record the result of study of the whole lesson each on his track on the respective main tape 4. The one head for tracks A to E corresponding to track 26 on the main tape 4, is then switched on by all the pupils so that they may record in pace with the teacher's recording. The teacher can then after the lesson at any suitable occasion listen to the results of his pupils and on a possibly additional teacher's track give his comments to the recording of his pupils, point out wrong pronunciation etc. This additional teacher's track may be one half of a pupil's, i.e., this track is erased to half the track width, the teacher's comments being recorded on the other track half. The recording of the teacher's comments may, of course, be performed in any other suitable manner. Thus, the reproducing heads 6 may, for example, consist of double heads, thus enabling the teacher while listening to each pupil separately, to correct him simultaneously. The comments will then be recorded on an adjacent track. The heads of assembly 16 must in such a case be separated so that there is room for a track of comments between every pupil's track, this, of course, requiring special arrangements so that the pupils may listen to the latter tracks, for example, during a following lesson. Thus, the main tape may be played back to each pupil during a following lesson so that the pupil both hears the teacher's comments and his own recording. The main tape 4 may thus be subdivided into two halves in the same manner as the tape loop 12, viz. an upper half, onto which various whole lessons are recorded, and a lower half onto which the pupils can record the results of their studies.

As will be seen by FIG. 1 there are possibilities of arranging three different lengths of tape loop 12. It may have such a length that it is made to turn around both or one of the idlers 13 or 14 instead of running about the roller 15 as in the case illustrated herein. In addition, the motor driving the whole tape recorder may have two or more speeds in order still more to vary the time of revolution of the loop dependent on the requirements of each special case. Although it is of great advantage that the means driving the tape 4 are mounted on the same base plate 1 as the driving means of the tape loop 12, this is not a necessary requirement of the invention, but separate appliances may of course be employed, and a corresponding pile 16 of heads may be provided on the apparatus carrying the main tape 4 to make possible the recording of the result of studies of the pupils. Naturally, it is also possible to substitute the head 6 by an assembly of heads in the shape of a pile located transversely to the tape 4.

With an arrangement according to the present invention it is possible in a manner which is convenient and effective for the pupil to learn various exercises and lessons within the various fields of teaching, and in particular in the field of languages, music and drama.

I claim:

1. A sound recording and reproducing apparatus, particularly for language teaching purposes, comprising: an endless tapelike sound recording carrier and means for moving same at a constant speed, said carrier having a series of laterally spaced tracks thereon;

some of said tracks having pre-recorded messages thereon and others of said tracks being blank to receive input messages;

a plurality of sound reproducing heads each being associated with one of said pre-recorded tracks, and a plurality of recording heads each being associated with one of said blank tracks, said heads being arranged crosswise of said recording carrier, the reproducing heads being arranged to reproduce pre-recorded messages from their associated tracks and the recording heads being arranged to record input messages on their associated tracks;

a plurality of playback means selectively coupled to said reproducing heads for selectively reproducing any one of said pre-recorded messages at several sound reproducing points; and microphone means at said sound reproducing points coupled to said recording heads so that input messages can be recorded on the tracks associated with the respective recording heads.

2. An apparatus according to claim 1, in which said playback means at each sound reproducing point comprises an earphone, and including switching means foı selectively connecting said earphone to any one of said sound reproducing heads.

3. An apparatus according to claim 2, in which said switching means comprises a separate switch for each earphone, so that each earphone can be connected to any one of said sound reproducing heads independently of other earphones.

4. An apparatus according to claim 1, in which a second tapelike sound recording carrier is arranged adjacent said endless carrier, said second carrier being adapted to have recorded thereon the teacher's lesson, means for reproducing the teacher's lesson on said second carrier and recording same on the tracks of said endless carrier which are associated with said sound reproducing heads.

5. An apparatus according to claim 4, including guide means for guiding both carriers, said guide means being arranged so that when one of the carriers is removed, the other carrier can be arranged to travel at least in part through a portion of the normal path of said one carrier.

6. An apparatus according to claim 4, including a common drive for moving both of said carriers, said drive including a drive capstan and tape moving rolls frictionally coupled with said drive capstan, said rolls drivingly engaging said carriers.

7. An apparatus according to claim 6, in which said tape moving rolls are mounted on levers so that they can be swung into and out of contact with said capstan.

8. A method of teaching languages using an endless tapelike sound recording carrier having a plurality of tracks, comprising the steps of:

(1) recording separate successive portions of a teacher's lesson on separate tracks on said carrier;

(2) selectively audibly reproducing a portion of the lesson by playing back the recording on one of said tracks;

(3) recording on a separate practice track on said carrier a student's repetition of said portion of the lesson;

(4) alternately playing back said portion of the lesson and the student's repetition thereof and erasing the student's former repetition and recording a student's new repetition of said portion of the lesson on said practice track until the student's repetition of the lesson is satisfactory; and (5) erasing the student's latest repetition and then repeating steps (2), (3) and (4) for each successive portion of the lesson until the lesson has been completed.

9. A method according to claim 8, in which a plurality of students can make use of the same carrier by recording the students' repetitions of the portions of the lesson on separate practice tracks on said carrier, each student carrying out steps (2), (3), (4) and (5) independently of the other students.

References Cited

UNITED STATES PATENTS

| | | | |
|---|---|---|---|
| 3,059,348 | 10/1962 | Mezzacappa | 35—35.3 |
| 3,142,909 | 8/1964 | Irazoqui | 35—35.3 |
| 3,155,778 | 11/1964 | Meyer | 35—35.3 |
| 3,269,033 | 8/1966 | Redfield | 35—35.3 |

FOREIGN PATENTS

| | | |
|---|---|---|
| 681,578 | 3/1964 | Canada. |

EUGENE R. CAPOZIO, *Primary Examiner.*

W. GRIEB, *Assistant Examiner.*